United States Patent [19]
Greiff et al.

[11] Patent Number: 5,515,724
[45] Date of Patent: *May 14, 1996

[54] MICROMECHANICAL GYROSCOPIC TRANSDUCER WITH IMPROVED DRIVE AND SENSE CAPABILITIES

[75] Inventors: Paul Greiff, Wayland; Burton Boxenhorn, Chestnut Hill, both of Mass.

[73] Assignee: The Charles Stark Draper Laboratory, Inc., Cambridge, Mass.

[*] Notice: The portion of the term of this patent shall not extend beyond the expiration date of Pat. No. 5,408,877.

[21] Appl. No.: 425,857

[22] Filed: Apr. 20, 1995

Related U.S. Application Data

[63] Continuation of Ser. No. 851,913, Mar. 16, 1992, Pat. No. 5,408,877.

[51] Int. Cl.⁶ ................................................. G01P 9/04
[52] U.S. Cl. ........................................................ 73/504.12
[58] Field of Search .......................... 73/505, 517 AV, 73/517 R, 517 B, 518, 504, 504.12, 515.15, 515.29; 310/329; 74/5.6 D

[56] References Cited

U.S. PATENT DOCUMENTS

| Re. 32,931 | 5/1989 | Staudte | 73/505 |
|---|---|---|---|
| Re. 33,479 | 12/1990 | Juptner et al. | 73/505 |
| 3,053,095 | 9/1962 | Koril et al. | 73/504 |
| 3,251,231 | 5/1966 | Hunt et al. | 73/505 |
| 3,370,458 | 2/1968 | Dillon | 73/141 |
| 3,696,429 | 10/1972 | Tressa | 343/180 |
| 3,913,035 | 10/1975 | Havens | 331/107 R |
| 4,044,305 | 8/1977 | Oberbeck | 324/154 R |

(List continued on next page.)

FOREIGN PATENT DOCUMENTS

| 55-121728 | 9/1980 | Japan . |
|---|---|---|
| 58-136125 | 8/1983 | Japan . |
| 59-037722 | 3/1984 | Japan . |
| 59-158566 | 9/1984 | Japan . |
| 61-144576 | 7/1986 | Japan . |
| 62-071256 | 8/1987 | Japan . |
| 62-221164 | 9/1987 | Japan . |
| 63-169078 | 7/1988 | Japan . |
| 2183040 | 5/1987 | United Kingdom . |
| 94/01941 | 2/1992 | WIPO . |
| 93/05401 | 3/1993 | WIPO . |

OTHER PUBLICATIONS

Barth, P. W. et al., "A Monolithic Silicon Accelerometer With Integral Air Damping and Overrange Protection," 1988 IEEE, pp. 35–38, no month.

(List continued on next page.)

*Primary Examiner*—Hezron E. Williams
*Assistant Examiner*—Christine K. Oda
*Attorney, Agent, or Firm*—Weingarten, Schurgin, Gagnebin & Hayes

[57] ABSTRACT

A double gimbal micromachined gyroscopic transducer is provided in a substrate having a pit extending downwardly from a top surface of the substrate. A gyroscopic transducer element suspended above the pit comprises an outer sense gimbal plate integral with the substrate, coupled to the substrate by a pair of flexible elements attached to opposite ends of the plate. The flexible elements are axially aligned to permit oscillatory motion about a sense axis passing through the flexible elements. The gyroscopic transducer further includes an inner drive gimbal plate integral with and interior to the sense gimbal plate. The drive gimbal plate is coupled to the sense gimbal plate by a second pair of flexible elements along an axis orthogonal to the first pair of flexible elements. The drive gimbal plate also includes a balanced mass generally centrally located on the drive gimbal plate. Also included are drive and sense electronics, for energizing the drive gimbal plate to oscillate about the drive axis, and for sensing any movement of the sense gimbal plate indicative of an angular rate about an input axis. The sense electronics includes a sense electrode disposed so as not to be in close proximity to and interfere with free oscillatory motion of the drive gimbal plate.

14 Claims, 3 Drawing Sheets

U.S. PATENT DOCUMENTS

| | | | |
|---|---|---|---|
| 4,122,448 | 10/1978 | Martin | 343/7.7 |
| 4,144,764 | 3/1979 | Hartzell, Jr. | 73/497 |
| 4,155,257 | 5/1979 | Wittke | 73/497 |
| 4,234,666 | 11/1980 | Gursky | 428/573 |
| 4,321,500 | 3/1982 | Paros et al. | 310/321 |
| 4,336,718 | 6/1982 | Washburn | 73/517 B |
| 4,342,227 | 8/1982 | Peterson et al. | 73/510 |
| 4,381,672 | 5/1983 | O'Conner et al. | 73/505 |
| 4,406,992 | 9/1983 | Kurtz et al. | 338/2 |
| 4,411,741 | 10/1983 | Janata | 204/1 T |
| 4,414,852 | 11/1983 | McNeill | 73/765 |
| 4,447,753 | 8/1984 | Ochiai | 310/312 |
| 4,468,584 | 8/1984 | Nakamura et al. | 310/370 |
| 4,478,076 | 10/1984 | Bohrer | 73/204 |
| 4,478,077 | 10/1984 | Bohrer et al. | 73/204 |
| 4,483,194 | 11/1984 | Rudolf | 73/517 R |
| 4,484,382 | 11/1984 | Kawashima | 29/25.35 |
| 4,490,772 | 12/1984 | Blickstein | 361/281 |
| 4,495,499 | 1/1985 | Richardson | 343/5 DD |
| 4,499,778 | 2/1985 | Westhaver et al. | 74/5 F |
| 4,502,042 | 2/1985 | Wuhrl et al. | 340/568 |
| 4,522,072 | 6/1985 | Sulouff et al. | 73/765 |
| 4,524,619 | 6/1985 | Staudte | 73/505 |
| 4,538,461 | 9/1985 | Juptner et al. | 73/505 |
| 4,585,083 | 4/1986 | Nishiguchi | 177/229 |
| 4,590,801 | 5/1986 | Merhav | 73/510 |
| 4,592,242 | 6/1986 | Kempas | 74/5 F |
| 4,596,158 | 6/1986 | Strugach | 74/5 F |
| 4,598,585 | 7/1986 | Boxenhorn | 73/505 |
| 4,600,934 | 7/1986 | Aine et al. | 357/26 |
| 4,619,001 | 10/1986 | Kane | 455/192 |
| 4,621,925 | 11/1986 | Masuda et al. | 356/350 |
| 4,628,283 | 12/1986 | Reynolds | 331/68 |
| 4,629,957 | 12/1986 | Walters et al. | 318/662 |
| 4,639,690 | 1/1987 | Lewis | 331/96 |
| 4,644,793 | 2/1987 | Church | 73/505 |
| 4,651,564 | 3/1987 | Johnson et al. | 73/204 |
| 4,653,326 | 3/1987 | Danel et al. | 73/517 R |
| 4,654,663 | 3/1987 | Alsenz et al. | 340/870.3 |
| 4,665,605 | 5/1987 | Kempas | 29/434 |
| 4,670,092 | 6/1987 | Motamedi | 156/643 |
| 4,671,112 | 6/1987 | Kimura et al. | 73/505 |
| 4,674,180 | 6/1987 | Zavracky et al. | 29/622 |
| 4,674,319 | 6/1987 | Muller et al. | 73/23 |
| 4,679,434 | 7/1987 | Stewart | 73/517 B |
| 4,680,606 | 7/1987 | Knutti et al. | 357/26 |
| 4,699,006 | 10/1987 | Boxenhorn | 73/517 AV |
| 4,705,659 | 11/1987 | Bernstein et al. | 264/29.6 |
| 4,706,374 | 11/1987 | Murkami | 437/225 |
| 4,712,439 | 12/1987 | North | 74/84 R |
| 4,727,752 | 3/1988 | Peters | 73/517 AV |
| 4,735,506 | 4/1988 | Pavlath | 356/350 |
| 4,736,629 | 4/1988 | Cole | 73/517 R |
| 4,743,789 | 5/1988 | Puskas | 310/316 |
| 4,744,248 | 5/1988 | Stewart | 73/505 |
| 4,744,249 | 5/1988 | Stewart | 73/505 |
| 4,747,312 | 5/1988 | Herzl | 73/861.38 |
| 4,750,364 | 7/1988 | Kawamura et al. | 73/510 |
| 4,761,743 | 8/1988 | Wittke | 364/566 |
| 4,764,244 | 8/1988 | Chitty et al. | 156/630 |
| 4,776,924 | 10/1988 | Delapierre | 156/647 |
| 4,783,237 | 11/1988 | Aine et al. | 437/15 |
| 4,789,803 | 12/1988 | Jacobsen et al. | 310/309 |
| 4,792,676 | 12/1988 | Hojo et al. | 250/231 GY |
| 4,805,456 | 2/1989 | Howe et al. | 73/517 AV |
| 4,808,948 | 2/1989 | Patel et al. | 331/4 |
| 4,834,538 | 5/1989 | Heeks et al. | 356/350 |
| 4,851,080 | 7/1989 | Howe et al. | 156/647 |
| 4,855,544 | 8/1989 | Glenn | 200/61.45 R |
| 4,869,107 | 9/1989 | Murakami | 73/517 R |
| 4,882,933 | 11/1989 | Petersen et al. | 73/517 R |
| 4,884,446 | 12/1989 | Ljung | 73/505 |
| 4,890,812 | 1/1990 | Chechile et al. | 248/674 |
| 4,893,509 | 1/1990 | MacIver | 73/517 AV |
| 4,898,032 | 2/1990 | Voles | 73/505 |
| 4,899,587 | 2/1990 | Staudte | 73/505 |
| 4,900,971 | 2/1990 | Kawashima | 310/361 |
| 4,901,586 | 2/1990 | Blake et al. | 73/862.59 |
| 4,916,520 | 4/1990 | Kurashima | 357/71 |
| 4,922,756 | 5/1990 | Henrion | 73/517 R |
| 4,929,860 | 5/1990 | Hulsing, II et al. | 310/366 |
| 4,981,359 | 1/1991 | Tazartes et al. | 356/350 |
| 5,001,383 | 3/1991 | Kawashima | 310/367 |
| 5,016,072 | 5/1991 | Greiff | 357/26 |
| 5,025,346 | 6/1991 | Tang | 361/283 |
| 5,060,039 | 10/1991 | Weinberg et al. | 357/26 |
| 5,090,809 | 2/1992 | Ferrar | 356/350 |
| 5,094,537 | 3/1992 | Karpinski, Jr. | 356/350 |
| 5,138,883 | 8/1992 | Paquet et al. | 73/504 |
| 5,195,371 | 3/1993 | Greiff | 73/505 |
| 5,203,208 | 4/1993 | Bernstein | 73/505 |
| 5,205,171 | 4/1993 | O'Brian et al. | 73/517 B |
| 5,216,490 | 6/1993 | Greiff et al. | 73/517 R |
| 5,226,321 | 7/1993 | Varnham et al. | 73/505 |
| 5,233,874 | 8/1993 | Putty et al. | 73/517 AV |
| 5,241,861 | 9/1993 | Hulsing, II | 73/505 |

OTHER PUBLICATIONS

Boxenhorn, B., et al., "An Electrostatically Rebalanced Micromechanical Accelerometer," AIAA Guidance, Navigation and Control Conference, Boston, Aug. 14–16, 1989, pp. 118–122.

Boxenhorn, B., et al., "Micromechanical Inertial Guidance System and its Application," Fourteenth Biennial Guidance Test Symposium, vol. 1, Oct. 3–5, 1989, pp. 113–131.

Boxenhorn, B., et al., "Monolithic Silicon Accelerometer," *Transducers '89*, Jun. 25–30, 1989, pp. 273–277.

Boxenhorn, B., et al., "A Vibratory Micromechanical Gyroscope," AIAA Guidance, Navigation and Control Conference, Minneapolis, Aug. 15–17, 1988, pp. 1033–1040.

Howe, R., et al., "Silicon Micromechanics: Sensors and Actuators On a Chip," IEEE Spectrum, Jul. 1990, pp. 29–35.

Moskalik, L., "Tensometric Accelerometers with Overload Protection," Meas. Tech. (USA), vol. 22, No. 12, Dec. 1979 (publ. May 1980), pp. 1469–1471.

Nakamura, M., et al., "Novel Electrochemical Micro-Machining and Its Application for Semiconductor Acceleration Sensor IC," *Digest of Technical Papers* (1987) Institute of Electrical Engineers of Japan, pp. 112–115, no month.

Petersen, K. E. et al., "Micromechanical Accelerometer Integrated with MOS Detection Circuitry," IEEE, vol. ED–29, No. 1 (Jan. 1982), pp. 23–27.

Petersen, Kurt E., et al., "Silicon as a Mechanical Material," *Proceedings of the IEEE*, vol. 70, No. 5, May 1982, pp. 420–457.

"Quartz Rate Sensor Replaces Gyros," *Defense Electronics*, Nov. 1984, pp. 177.

Rosen, Jerome, "Machining in the Micro Domain," *Mechanical Engieering*, Mar. 1989, pp. 40–46.

Teknekron Sensor Development Corporation, article entitled "Micro–Vibratory Rate Sensor," 1080 Marsh Road, Menlo Park, CA 94025, 2 pages, undated.

Bryzek, Janusz et al., "Micromachines on the March," IEEE Spectrum, May 1994, pp. 20–31.

IEEE Robotics & Automation Soc. in coop. w/ASME Dynamic Systems & Control Div., "Micro Electro Mechanical Systems, An Investigation of Micro Structures, Sensors, Actuators, Machines and Systems," IEEE Cat. #93CH3265-6, Ft. Lauderdale, FL, 2/7–10/93.

MICROMECHANICAL GYROSCOPIC TRANSDUCER WITH IMPROVED DRIVE AND SENSE CAPABILITIES

This application is a continuation of application U.S. patent application Ser. No. 07/851,913, filed Mar. 16, 1992 (which will issue on Apr. 25, 1995 as U.S. Pat. No. 5,408, 877).

FIELD OF THE INVENTION

This invention relates to micromachined gyroscopic transducers and more particularly, to a micromachined gyroscope with improved separation between drive and sense functions.

BACKGROUND OF THE INVENTION

Micromechanical gyroscopic transducers which are micromachined from single unitary substrates such as single crystal or polycrystalline silicon or quartz are now well known in the art. Such micromechanical gyroscopes have the potential for achieving high sensitivity and reliability at the low cost of a mass produced device.

An exemplary gyroscopic transducer fabricated from a semiconductor wafer is disclosed in U.S. Pat. No. 5,016,072 entitled "Semiconductor Chip Gyroscopic Transducer" assigned to the assignee of the present invention.

The design of such devices seeks to optimize the performance of the device within the design constraints imposed by the choice of materials, while retaining a cost advantage.

Among the performance demands are a high signal to noise ratio in the readout or sense circuitry of the gyroscope. This high signal noise is a function of the capacitance between the stationary electrodes and the moving plate from which rate information is available. The signal to noise ratio is improved by having the largest capacitance possible and the largest change in that capacitance with rate. This translates into larger and closely spaced electrode plates.

SUMMARY OF THE INVENTION

The present invention features an improved signal to noise ratio in a double or dual gimballed micromechanical gyroscopic transducer by having the sense electrodes of the gyroscope associated with the outer gimbal plate rather than the inner gimbal plate as was done in the prior art, while the drive function is respectively transferred to the inner gimbal plate from the outer gimbal plate as was also done in the prior art. The electrodes are not then constrained by the motional requirements of the drive gimbal plate and can be closer to the sense gimbal plate and bigger.

A further advantage is that under conditions of torque restoration or rebalance to the sense plate, there is no superimposed signal from the drive motion. In particular, when the outer or sense gimbal plate is rebalanced, the inner drive gimbal plate is free to vibrate or oscillate about its supporting flexible elements without also causing rotation of the sense gimbal plate as occurred in the prior art, absent an angular rate about the input axis of the present invention. Additionally, since the sense axis is held in a truly fixed position, the sense gap, that is the gap between the sense electrodes and the outer gimbal plate, can be made very small, thus greatly increasing the sensitivity of the capacitive sense circuit, leading to a corresponding desired reduction in readout signal noise.

The present invention thus includes a dual or double gimballed micromachined gyroscopic transducer which is comprised of a substrate including a pit extending downwardly from a top surface of the substrate. A gyroscopic transducer element is suspended above the bottom of the pit. The gyroscopic transducer element comprises a sense gimbal plate which is integral with the substrate. The sense gimbal plate may take the form of a ring. The sense gimbal plate is coupled to the substrate by first and second flexible elements. A first end of each of the first and second flexible elements is coupled to opposite ends of the sense gimbal plate, while a second end of each of the first and second flexible elements is coupled to the substrate. The first and second flexible elements are axially aligned to permit oscillatory motion about a sense axis which passes through the first and second flexible elements and the sense gimbal plate.

The gyroscopic transducer element further includes a drive gimbal plate integral with and interior to the sense gimbal plate. The drive gimbal plate is coupled to the sense gimbal plate by third and fourth flexible elements. A first end of each of the third and fourth flexible elements is coupled to opposite ends of the drive gimbal plate, while a second end of each of the third and fourth flexible elements is coupled to the sense gimbal plate. Thus, the third and fourth flexible elements are also axially aligned to permit oscillatory motion of the drive gimbal plate about a drive axis which passes through the third and fourth flexible elements. The drive axis and therefore, the third and fourth flexible elements, are disposed orthogonal to the sense axis and the first and second flexible elements. The drive gimbal plate further includes a balanced mass generally centrally located on the drive gimbal plate.

The micromechanical gyroscopic transducer with improved drive and sense capability according to the present invention also includes means for causing the drive gimbal plate to oscillate about the drive axis. This means includes at least one drive electrode, coupled to circuitry for energizing the drive electrode. The drive electrode is disposed in spaced relationship to at least a portion of the drive gimbal plate. Together, the energizing circuitry and the at least one drive electrode are operative for causing the drive gimbal plate to oscillate about the drive axis. In the preferred embodiment, the drive gimbal plate is caused to oscillate near or at its resonant frequency.

The gyroscopic transducer of the present invention also includes means for sensing rotation of the sense gimbal plate, including at least one sense electrode, coupled to an electronic circuit for sensing rotation of the sense gimbal plate. The sense electrode is disposed in spaced relationship to at least a portion of the sense gimbal plate. The sense electrode is further disposed so as not to be in close proximity to, and interfere with free oscillatory motion of, the drive gimbal plate. Thus, the sensing circuit and the at least one sense electrode are operative for sensing rotation of the sense gimbal plate about the sense axis, and for providing an indication of angular rotation of the transducer about an input axis orthogonal to the drive and sense axes and which is detected by the gyroscopic transducer.

In the preferred embodiment, the at least one sense electrode includes a pair of bridge electrodes disposed parallel to the sense gimbal plate and to the sense axis, for preventing interference with the oscillation of the drive gimbal plate about the drive axis. In the preferred embodiment, the drive electrode typically includes a pair of buried electrodes integral with the bottom region of the pit.

In an alternative embodiment, both the drive and sense electrodes are located in the bottom region of the pit. In such an embodiment, the drive and sense electrodes may cross or intersect, with an intervening layer of insulative semiconductor material separating the two electrodes. In this embodiment, the sense electrode is located at the topmost region of the bottom of the pit, approximately 2 to 5 microns from the sense gimbal plate, while the drive electrode is located within approximately 10 to 30 microns below the drive gimbal plate.

Also in the preferred embodiment, the gyroscopic transducer of the present invention is fabricated from a single or monolithic semiconductor wafer. Accordingly, the drive and sense gimbal plates as well as the first through fourth flexible elements are defined by doping to make these elements resistant to selective etching such as anisotropic, EDP, electrochemical and photochemical etching. After doping the desired regions, a selective etching defines the pit region beneath the gimbal plates as well as the gimbal plates and connecting flexible elements.

DESCRIPTION OF THE DRAWINGS

These, and other features and advantages of the present invention will be better understood by reading the following detailed description taken together with the drawings, wherein.

DETAILED DESCRIPTION OF THE INVENTION

Figure 1:
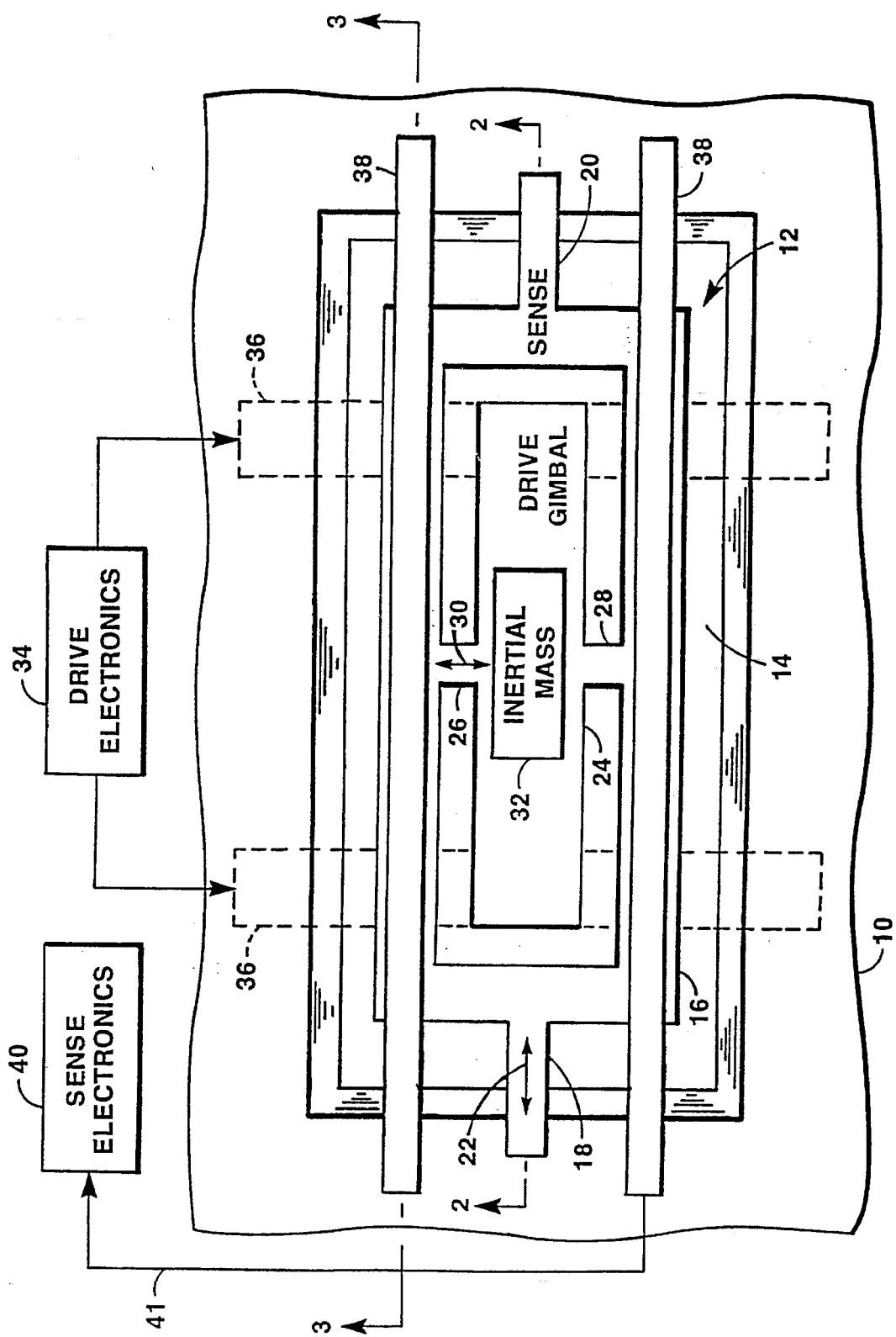
FIG. 1 is a top view of a schematic representation of the micromechanical gyroscopic transducer with improved drive and sense capabilities according to the present invention.

The micromechanical gyroscopic transducer with improved drive and sense capabilities according to the present invention is shown, in a preferred embodiment, in FIG. 1 and includes a substrate 10 of preferably N-type mono- or polycrystalline silicon. Selective doping and anisotropic, EDP, electrochemical, photochemical, or other selective type etching yields the gyroscopic transducer element 12 suspended above pit 14. The process of silicon doping and selective etching is well known to those skilled in the art.

The gyroscopic transducer element 12 is comprised of an outer sense gimbal 16 integral with substrate 10. The outer sense gimbal 16 is suspended and coupled to substrate 10 by first and second flexible elements 18 and 20, respectively. The first and second elements are disposed on opposite ends of the sense gimbal plate 16 and are axially aligned to permit oscillatory motion of the sense gimbal plate 16 about a sense axis 22 which passes through the first and second flexible elements.

Gyroscopic transducer element 12 also includes a drive gimbal plate 24 integral with and interior to the outer sense gimbal plate 16. The inner/drive gimbal plate 24 is coupled to the sense gimbal plate 16 by third and fourth flexible elements 26 and 28, respectively. The third and fourth flexible elements are also coupled to opposite sides or ends of drive gimbal plate 24. The third and fourth flexible elements are also axially aligned to permit oscillatory motion of the drive gimbal plate about a drive axis 30 which passes through the third and fourth flexible elements 26, 28. The drive axis and the third and fourth flexible elements are disposed orthogonal to the sense axis 22. In the preferred embodiment, the drive gimbal plate 24 also includes a balanced inertial mass 32 generally centrally located on the drive gimbal plate. The inertial mass may be formed by depositing metal, such as gold, on the surface of the gimbal plate, and preferably also includes a silicon tub extending below the drive gimbal plate. The tub is preferably backfilled with polysilicon or a metal such as gold.

The gyroscopic transducer of the present invention also includes electronics necessary to cause the drive gimbal plate to oscillate. These necessary electronics include drive electronics 34 coupled to one or more drive electrodes 36. In the preferred embodiment, the drive electrodes 36 are buried electrodes formed in the bottom of the anisotropically etched pit 14. Drive electrodes 36 are formed by selectively doping the desired regions in the bottom of the pit. Drive electrodes 36 are coupled to drive electronics 34 by means of metallization layers on the semiconductor wafer. The method of forming the buried electrodes and coupling them to the drive electronics are also well known to those skilled in the art. Additionally, various drive electronics located both on and off the semiconductor wafer itself are contemplated by the present invention and described in greater detail in U.S. Pat. No. 5,016,072 incorporated by reference.

The present gyroscopic transducer also includes at least one sense electrode 38 coupled to sense electronics 40 also by means of a metallization or conducting strip 41. In the preferred embodiment, sense electrode 38 includes a pair of bridge electrodes disposed parallel to sense gimbal plate 16.

The advantages of the gyroscopic transducer with improved drive and sense capabilities of the present invention will be better understood by referring to the operation of the transducer in which drive electronics 34 energize drive electrodes 36 and cause the inner/drive gimbal plate 24 to oscillate about the drive axis 30. Since there is no bridge electrode above the drive gimbal plate 24, the drive plate, which also serves as the gyroscopic element, may freely rotate about the drive axis without interference from overhead bridge electrodes as in the prior art.

Figure 2:
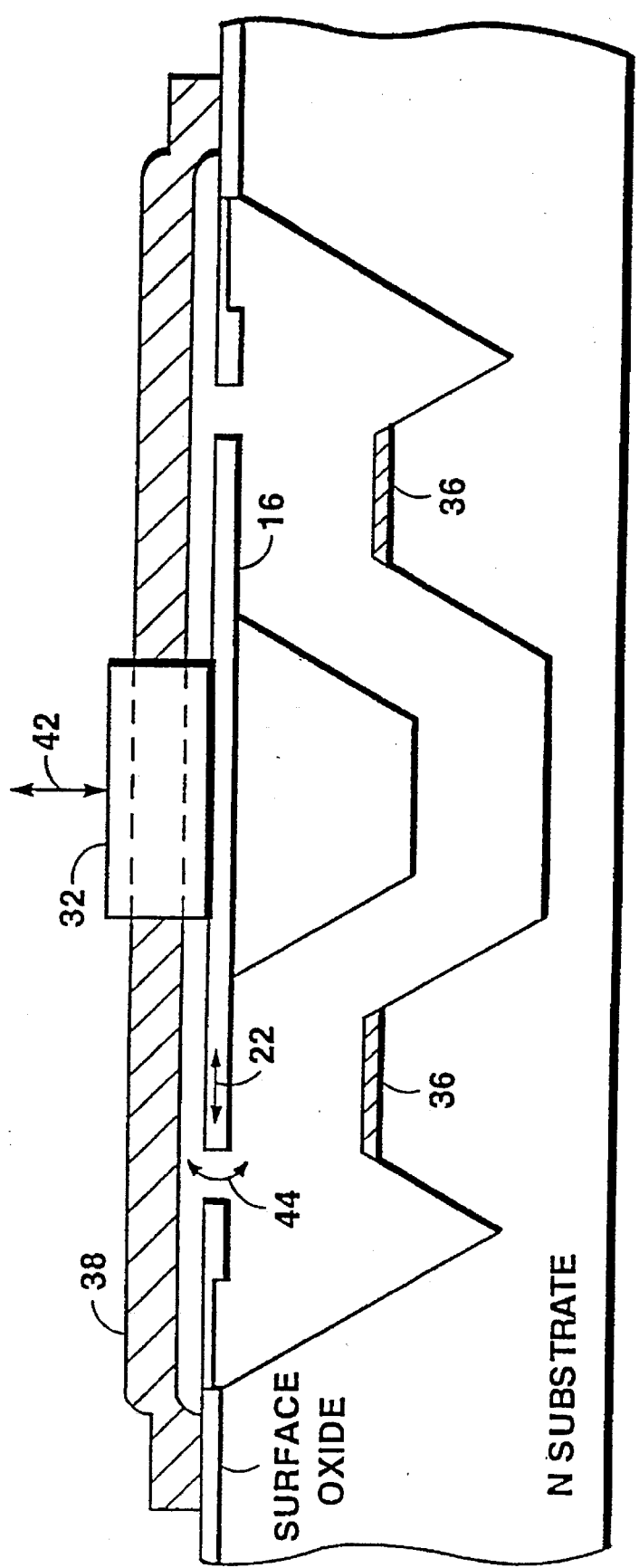
FIG. 2 is a cross-sectional view of the gyroscopic transducer of the present invention taken along lines 2—2 of FIG. 1.

When the gyroscopic transducer detects an angular rate about the input axis 42, FIG. 2, which is orthogonal to both the drive and sense axes, the gyroscopic action of the transducer initiated by the oscillating drive gimbal plate causes displacement of the sense gimbal plate 16 about the sense axis 22 as shown by arrow 44. This displacement is detected by the bridge electrodes 38. The sense electronics subsequently convert the displacement signal into an indication of angular rotation detected by the gyroscope. Most importantly, since the sense gimbal plate is the outermost gimbal plate, the bridge electrodes 38 may be placed in very close proximity to the plate, that is, within 2 to 5 microns from the plate.

Thus, by greatly reducing the distance between the bridge sense electrodes and the sense gimbal plate, referred to as the "sense gap," the sensitivity of the capacitive sense electronics can be greatly increased, thus leading to a corresponding desired reduction in read-out signal noise. Further, when the gyroscope is operated in a closed-loop rebalance mode wherein the sense gimbal plate is nulled about the sense axis, complete separation between the gyroscopic action of the inner drive gimbal plate which serves as the gyroscopic element from the outer sense gimbal plate is achieved, thereby resulting in a device with no conflicting geometric designs.

Figure 3:
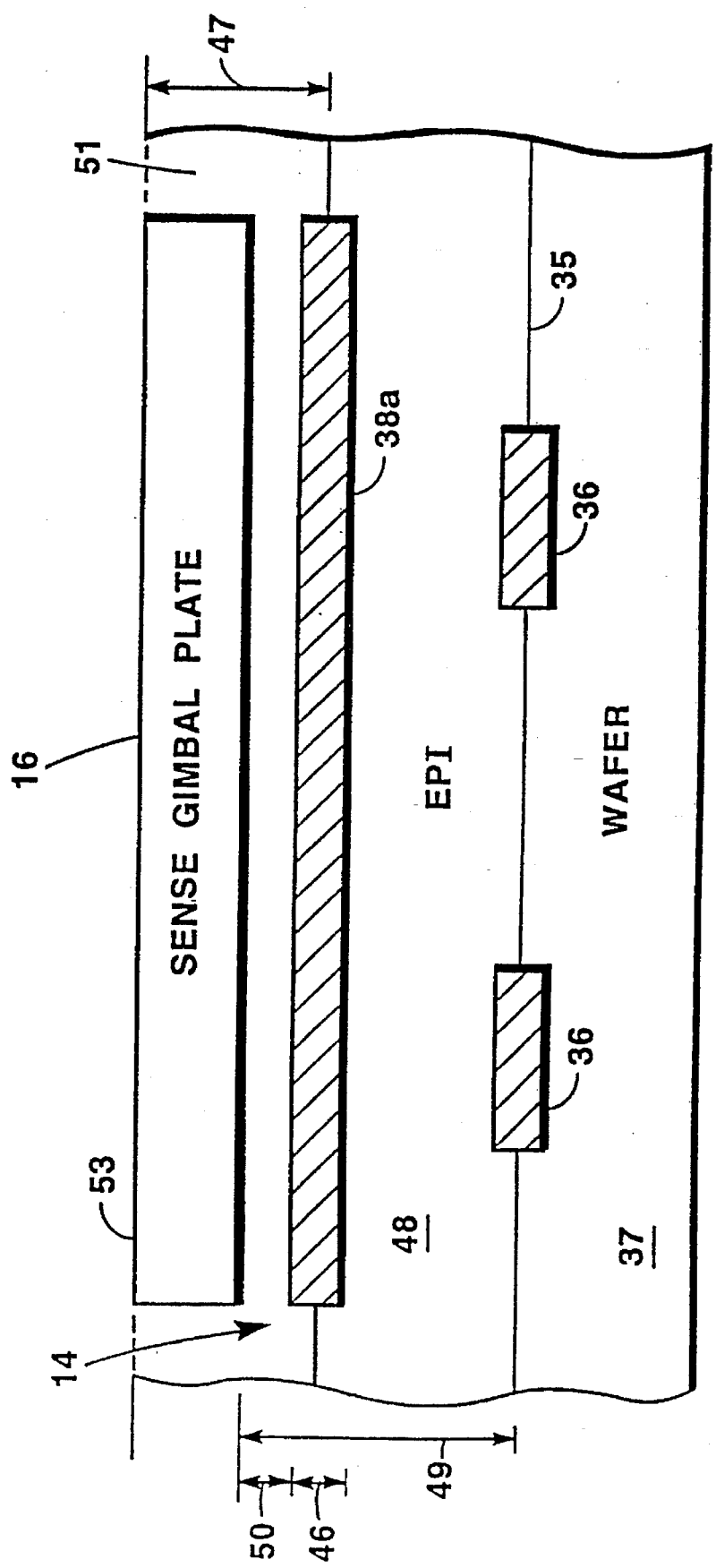
FIG. 3 is a cross-sectional view of another embodiment of the present invention taken along lines 3—3 of FIG. 1, wherein both drive and sense electrodes are defined in the bottom of the pit beneath the transducer element.

In another embodiment of the present invention, the sense electrodes such as electrode 38a, FIG. 3, may be buried electrodes similar to drive electrodes 36. In this embodiment, the shown sense electrode 38a is formed in the bottom of the selectively etched pit 14 and disposed below the sense gimbal plate 16.

Buried drive electrodes 36 are first diffused through the surface 35 of wafer 37. A first epitaxial layer 48 of approximately 16 microns in thickness is subsequently grown over wafer 37. Buried sense electrode 38a is then diffused in the first epitaxial layer 48. Finally, second epitaxial layer 51 of approximately 8 microns in thickness as indicated by arrow 47 is grown on top of the first epitaxial layer 48.

Sense gimbal plate 16 and the drive gimbal plate (not shown) are then diffused into the surface 53 of the second epitaxial layer. Both the drive and sense gimbal plates are diffused approximately 4 microns into the second epitaxial layer. During thermal processing of the device, both the drive and sense electrodes will up-diffuse into the adjacent epitaxial regions. Thus, since buried sense electrode 38a up-diffuses approximately 2 microns, an approximately 2 micron gap indicated by arrow 50 will result after selective etching between buried sense electrode 38a and sense gimbal plate 50. Similarly, drive electrodes 36 will up-diffuse approximately 4 microns resulting in a net distance of approximately 16 microns, as indicated by arrow 49, between the buried drive electrodes and the drive gimbal plate (not shown).

By only lightly doping the drive and sense electrodes to a level of approximately $5 \times 10^{-18}$ ions/cm$^2$, and doping the N epitaxial regions to as high a level as possible, limited only by reverse voltage breakdown, subsequent processing of the gyroscopic transducer device will not cause the bridge and sense electrodes to diffuse into one another, as would happen with heavily doped areas.

Thus, as with the bridge sense electrode, buried sense electrode 38a may be located in very close proximity to sense gimbal plate 16 since the gyroscopic action of the inner drive gimbal plate is now completely separate and distinct from the outer sense gimbal plate. The buried sense electrode 38a may also be used in a manner similar to the bridge sense electrode that is, in a closed-loop rebalance mode to null the sense gimbal plate and provide an indication of angular rate about the input axis.

Other embodiments, modifications and substitutions by those of ordinary skill in the art are considered to be within the scope of the present invention, which is not to be limited except by the claims which follow.

We claim:

1. A micromechanical gyroscope comprising:
   a sense gimbal plate capable of oscillatory motion about a sense axis;
   a drive gimbal plate disposed interior to said sense gimbal plate and coupled to said sense gimbal plate by first and second flexible elements axially aligned to permit oscillatory motion of said drive gimbal plate about a drive axis orthogonal to said sense axis, wherein said drive gimbal plate has an inertial mass thereon;
   a drive circuit for causing said drive gimbal plate to oscillate about said drive axis; and
   a sense circuit including at least one sense electrode disposed so as not to be in close proximity to, and interfere with free oscillatory motion of said drive gimbal plate, for sensing rotation of said sense gimbal plate about said sense axis to provide an indication of angular rotation detected by said gyroscope about an input axis orthogonal to said drive and sense axes.

2. The micromechanical gyroscope recited in claim 1 wherein said at least one sense electrode is disposed in spaced relationship to at least a portion of said sense gimbal plate.

3. The micromechanical gyroscope recited in claim 2 wherein said at least one sense electrode includes at least one bridge sense electrode disposed parallel to said sense gimbal plate and to said sense axis, wherein said at least one sense electrode is positioned to avoid interference with the oscillation of said drive gimbal plate about said drive axis.

4. The micromechanical gyroscope recited in claim 1 wherein said inertial mass is centrally located on said drive gimbal plate.

5. The micromechanical gyroscope recited in claim 1 further comprising a support over which said sense gimbal plate is supported by third and fourth flexible elements aligned to permit said oscillatory motion of said sense gimbal plate about said sense axis.

6. The micromechanical gyroscope recited in claim 5 wherein said drive circuit includes at least one drive electrode in spaced relationship to at least a portion of said drive gimbal plate and means for energizing said at least one drive electrode.

7. The micromechanical gyroscope recited in claim 6 wherein said at least one drive electrode includes a buried electrode integral with said support.

8. The micromechanical gyroscope recited in claim 5 wherein said support has a pit in a top surface thereof and said sense gimbal plate is supported over said pit.

9. A dual gimbal micromachined gyroscopic transducer comprising:
   a substrate having a top surface;
   a gyroscopic transducer element suspended above said top surface of said substrate and comprising:
      a sense gimbal plate integral with said substrate, said sense gimbal plate coupled to said substrate by first and second flexible elements, a first end of each of said first and second flexible elements coupled to opposite ends of said sense gimbal plate, and a second end of each of said first and second flexible elements coupled to said substrate, said first and second flexible elements axially aligned to permit oscillatory motion about a sense axis which passes through said first and second flexible elements;
      a drive gimbal plate integral with and interior to said sense gimbal plate, said drive gimbal plate coupled to said sense gimbal plate by third and fourth flexible elements, a first end of each of said third and fourth flexible elements coupled to opposite ends of said drive gimbal plate, and a second end of each of said third and fourth flexible elements coupled to said sense gimbal plate, said third and fourth flexible elements axially aligned to permit oscillatory motion about a drive axis which passes through said third and fourth flexible elements, said drive axis disposed orthogonal to said sense axis, said drive gimbal plate further including a balanced mass generally centrally located on said drive gimbal plate;
   means for oscillating said drive gimbal plate including at least one drive electrode, coupled to means for energizing said at least one drive electrode, said at least one drive electrode disposed in spaced relationship to at least a portion of said drive gimbal plate, said means for energizing said at least one drive electrode operative for causing said drive gimbal plate to oscillate about said drive axis; and means for sensing rotation of said sense gimbal plate, said means for sensing including at least one sense electrode, coupled to said means for sensing rotation of said sense gimbal plate, said at least one sense electrode disposed in spaced relationship to at least a portion of said sense gimbal plate, said at least one sense electrode disposed so as not to be in close proximity to, and interfere with free oscillatory motion of said drive gimbal plate, said means for sensing and said at least one sense electrode operative for sensing rotation of said sense gimbal plate about said sense axis, said means for sensing providing an indication of angular rotation detected by said gyroscopic transducer about an input axis orthogonal to said drive and sense axes.

10. The transducer recited in claim 9 wherein said at least one sense electrode includes at least one bridge sense electrode disposed parallel to and spaced from said sense gimbal plate so as to prevent interference with the oscillation of said drive gimbal plate about said drive axis by said at least one bridge sense electrode.

11. The gyroscopic transducer of claim 10 wherein said at least one bridge sense electrode is spaced from said sense gimbal plate by between approximately 2 and 5 microns.

12. The gyroscopic transducer of claim 9 wherein said substrate has a pit in said top surface and said at least one drive electrode includes a buried electrode integral with a bottom region of said pit.

13. The gyroscopic transducer of claim 9 wherein said substrate has a pit in said top surface and said at least one sense electrode includes at least one buried electrode integral with a bottom region of said pit.

14. The gyroscopic transducer of claim 9 wherein said means for oscillating said drive gimbal plate causes said drive gimbal plate to oscillate at the resonant frequency of the drive gimbal plate.

* * * * *